Aug. 10, 1954     H. E. FREEMAN     2,685,817
PROJECTOR SCREEN UNIT
Filed April 26, 1951
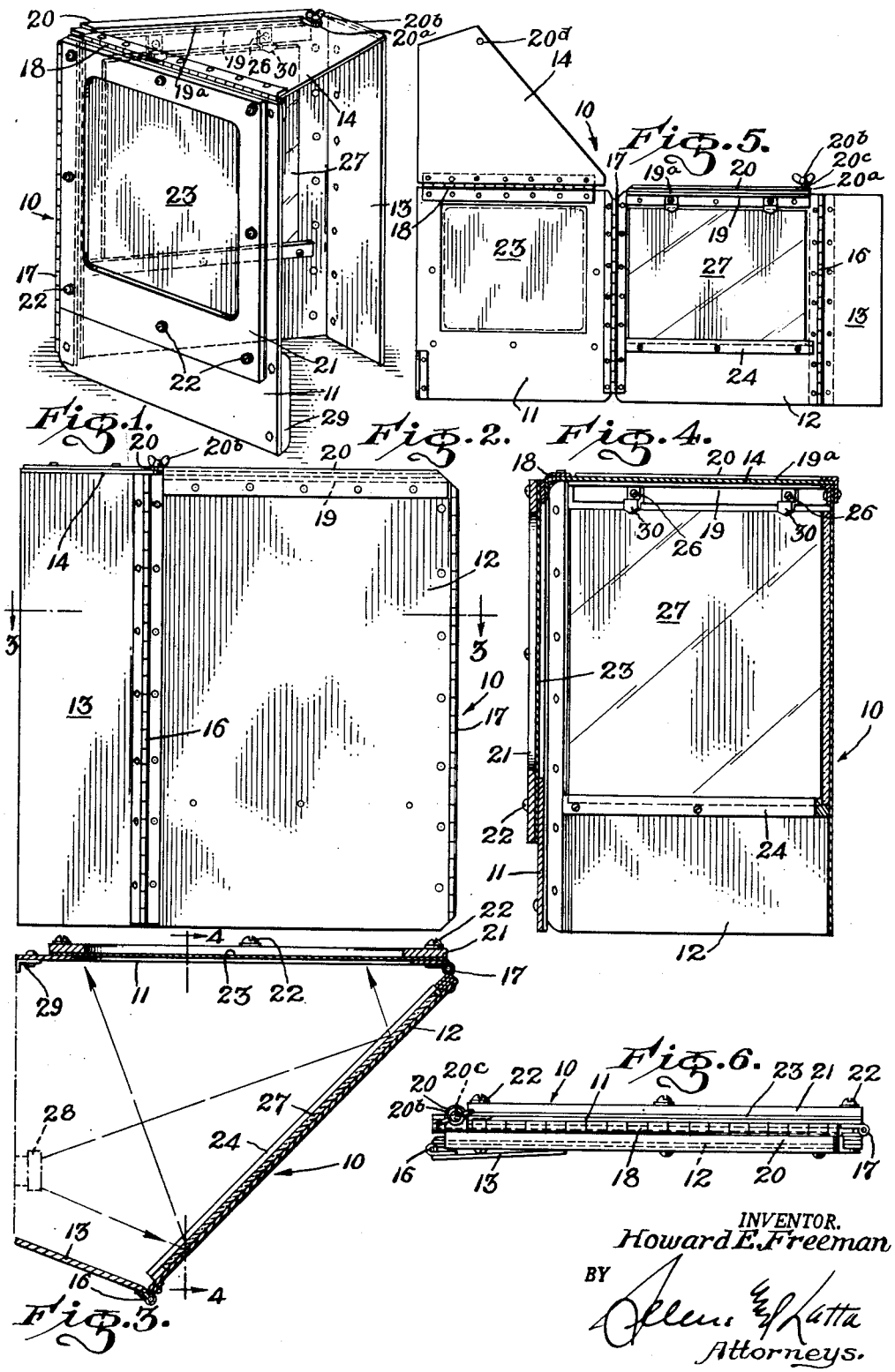
INVENTOR.
Howard E. Freeman Patented Aug. 10, 1954

2,685,817

UNITED STATES PATENT OFFICE 2,685,817

PROJECTOR SCREEN UNIT

Howard E. Freeman, Encino, Calif.

Application April 26, 1951, Serial No. 223,083

2 Claims. (Cl. 88—24)

This invention relates generally to an improved device for the display of projected light images. In particular it relates to an improved projector screen unit which may be utilized in illuminated surroundings to display an image of restricted size produced by a conventional projector of the cinematic or still type.

In the conventional projection set-up a magnified image is produced on a screen by the passage of a conical light beam thereto through a film having varigated opaque and transparent areas conforming to the character of the image recorded thereon. The projection of the image from the screen is ultimately depended on to convey the film subject to the eyes of the observer. For this reason the screen is usually viewed from the side upon which the projection light source is located. This relationship imposes undesirable restrictions in the use of the conventional set-up in that unless the projector is located a considerable distance from the screen there is interference with the observer's perception of the image on the screen. If the distance between the projector and the screen is too limited then, depending whether the observer is between the projector and the screen or is located behind the projector, either the observer himself obstructs the light passage to the screen or his view thereof is partially or wholly obstructed by the projector. Additionally, the use of the conventional projector set-up is limited to surroundings having few or no sources of light apart from the projector lamp itself, for the reason that presence on the screen of light from extraneous sources reduces the apparent intensity of the image produced by the projection lamp to near invisibility. The apparent intensity of the projection lamp image is the degree with which it contrasts with its background, the screen. The degree of contrast increases with an increase in the actual intensity of the lamp image on the screen and decreases with the presence of increased amounts of extraneous light on the screen. The actual intensity of the image on the screen increases as the intensity of the lamp increases and/or the distance of the lamp from the screen diminishes.

In a device constructed in accordance with the present invention separate reflecting and displaying surfaces are provided. The light rays from the projection lamp inpinge directly on a reflector which reflects the image to the displaying surface. The observer views the image from the side of a translucent display screen spaced from the location of the reflector and projector, hence both observer interference to projection beam passage and projector interference with the observer's view of the screen is eliminated. The distance traveled by the image light from projector to reflector to screen surface is less than projection to screen distance in the normal projection set-up, hence the actual intensity of the projection image on the screen is greater. Extraneous light is eliminated from the reflecting surface by enclosing it in a light-impervious chamber. The intensity of extraneous light reflected from the viewing screen is reduced by constructing minute irregularities in its outer surface to disperse reflected extraneous light as non-parallel rays. Reduction in intensity of extraneous or background light on the viewing screen combined with increased actual intensity of the light image thereof magnifies the apparent intensity of the image, increasing projection efficiency.

It is an object of this invention to provide a compact projector screen unit of increased efficiency suitable for use with a conventional cinematic or slide projector in lighted areas.

It is a further object of the invention to provide a projector screen unit suitable for use with a conventional cinematic or slide projector and constructed to permit unobstructed view of the image-displaying surface from all positions.

These and other objects will appear as the invention is more fully described hereinafter in the following specification and as illustrated in the accompanying drawing, and finally pointed out in the appended claims.

In the drawing:

Figure 1 is an isometric view of a projector screen unit constructed in accordance with the present invention;

Figure 2 is a rear view of the unit of Figure 1;

Figure 3 is an horizontal section upon the line 3—3 of Figure 2;

Figure 4 is a vertical section taken on the line 4—4 of Figure 3; and

Figures 5 and 6 are views of the unit in its fully opened and closed relationships, respectively.

Referring again to the drawing a projector screen unit constructed in accordance with the present invention is indicated generally by the reference character 10 and is seen to comprise a front wall 11 having a hinge 17 affixed to its inside surface at its vertical edge; a side wall 12 having one vertical edge pivotally connected by hinge 17 to wall 11, the other vertical edge carrying a hinge 16; and a relatively narrow rear wall member 13. The flanges of hinge 16 are attached to the outside surfaces, respectively, of wall member 12 and rear wall member 13. A quadrangular cover member 14, pivotally hinged at the top edge of front wall 11 by a hinge 18, is adapted to overlie the three vertical wall members 11, 12 and 13 when the unit is in operative relationship as illustrated in Figure 1.

Two L-shaped members 19 and 20 are rigidly fixed to the inside and outside surfaces, respectively, of side wall 12 at and along the top edge thereof. The unattached or free flanges of the L-shaped members extend parallel and are directed perpendicularly to wall member 12. They form, with the top edge of wall member 12, a channel 19a with its open side facing toward wall 11, with the unit in its operative relationship, and which is adapted to receive and seat the edge of top member 14. The free flange of L-shaped member 20, which forms the upper wall of the channel 19a, is formed at one end on its edge with a semicircular abutment 20a through which extends a threaded circular seat 20b adapted to receive a removable wing nut 20c. With the screen unit in its operative position the lower end of the wing nut extends through a bore 20d in cover member 14 to lock the latter in seating relationship in channel 19a. A translucent projection screen 23 overlies a large aperture formed in front wall 11 and, as shown in Figure 4, is retained in place through having its peripheral edges clamped to the wall by a frame 21 which is itself secured to the outside surface of the front wall by a plurality of screws 22.

Referring to Figure 4, a mirror or reflector 27 is mounted on the inner face of side wall 12 and is retained fixedly in place by means of a channeled bracket 24 which receives its lower edge and by two small spring clamps 30 overlying its top edge and secured to the wall by screws 26.

An L-sectioned bracket 29 is secured to the front wall 11 adjacent its unhinged vertical edge, as shown in Figure 3, and provides an abutment for the projector to aid in properly positioning it with respect to the unit.

In Figure 6 the projector screen unit constructed in accordance with the present invention is shown folded for storage or carriage when not in use. To fold the screen unit into this relationship wing nut 20c is first threaded upwardly and the cover 14 pivoted on its hinge 18 until it lies flat against the inner surface of front wall 11. Back wall 12 is then pivoted toward front wall 11 on its hinge 17 until it abuts cover member 14. Thin strips serving as shims underlie the flange of hinge 17 and space it from the inside surface of side wall 12 in order that the presence of reflector 27 and channeled bracket 24 on the inside surface of inclined side wall 12 will not prevent the latter from being moved to a closed position in which it extends parallel to front wall 11 and cover member 14. Short rear wall member 13 is then pivoted on its hinge 16 until it abuts the outer surface of side wall 12. Wing nut 20c is now repositioned in its seat 20b in abutment 20a until its threaded end, projecting below the abutment 20a, extends alongside hinge 18 effectively to retain the parts in their folded relationship.

To prepare the screen unit for use the operator unfolds the screen to the flat coplanar relationship as shown in Figure 5, having first raised the wing nut 20c. He then places the unit upright, preferably holding the cover member 14 in his left hand and the short rear wall member 13 in his right hand. Using his left hand he pivots front wall member 11 on hinge 17, at the same time pivoting cover member on hinge 18 until the unhinged edge of the cover member is slipped into channel 19a at the top edge of side wall 12. Wing nut 20c is then threaded downwardly in its seat 20b until its lower end extends into seat 20d of cover member 14, clamping the latter securely in channel 19a. The short rear wall member 13 may then be pivoted until its top edge underlies the cover member.

As shown in Figure 1, in its operative position the screen unit comprises a four-sided polyhedron, enclosed on three of its sides by wall members 11, 12 and 13, respectively; at its lower end by the projector unit supporting surface; and at its upper end or top by cover member 14. The fourth side of the polyhedron is open and is adapted to receive the lens unit of a conventional cinematic or still projector, indicated in dotted lines in Figure 3 by reference character 28. The lens of the projector is directed toward mirror 27 on side wall member 12 so that the beam of light from the projector lamp, as magnified by the projector lens, will impinge angularly on the mirror, as shown in Figure 3.

The beam is reflected from the reflecting surface of the mirror so that each ray is reflected at the same angle as that at which it impinges in accordance with the optical principle that the angle of reflection equals the angle of incidence. The reflected beam of the projector is received by the translucent screen 23 of front wall 11 where the image is displayed for view by observers. In order that a distortion-free image may appear on the screen it is important that the angle with which the center ray of the conical projection beam strikes the reflecting surface be equal to the acute angle between front wall 11 and inclined side wall 12. The equality of these two angles is assured if the projector is positioned so that a vertical centerplane taken through its lens is parallel to the displaying screen. This result follows if care is taken to see that the front face of the projector abuts the flange of member 29 which extends perpendicularly inward from front wall 11 to which it is attached.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a collapsible projector screen unit of the class described, a vertical flat front wall formed with an aperture, a translucent screen extended across said aperture, a rectangular frame affixed rigidly on the outside surface of said front wall about said aperture clamping the peripheral edges of said screen to said front wall, a vertical flat inclined side wall, a horizontal grooved supporting bracket affixed rigidly on the inside surface of said inclined side wall, said groove of said bracket being adapted to receive the lower edge of a reflector to support said reflector in place on and parallel to said side wall, a plurality of clamps on the inside surface of said side wall to retain the top edge of said reflector against said side wall, a vertical narrow flat rear wall member, said front wall and said narrow rear wall members each having one of their vertical edges connected pivotally to a vertical edge of said inclined side wall, the lower edges of said wall members being adapted to rest on a flat horizontal supporting surface, an opaque cover member having one edge pivotally connected to the upper edge of one of said wall members and adapted to extend across to the upper edge of the other of said wall members, a first L-shaped member affixed to the outer surface of said inclined side wall, a second L-shaped member affixed to the inner surface of said inclined side wall, the horizontal flanges of said L-shaped members forming a channel with the top edge of said inclined side wall the open side of which faces toward and is adapted to receive the edge of said cover member with the latter extended horizontally, a threaded seat in said first L-shaped member, a wing bolt threaded in said seat adapted to retain the edge of said cover member in said channel to lock said screen unit in operative position, said wall members, said cover member and a supporting surface forming in the operative position of said screen unit a polyhedron open on one of its sides to receive the lens unit of a conventional projector, characterized in that in said operative position said reflecting surface faces said translucent screen in non-parallel relationship at an angle such that a beam of light projected on said reflector and parallel to said screen from said conventional projector is reflected to said translucent screen in a beam to produce an image of symmetrical fidelity visible to observers located outside said screen unit.

2. In a collapsible screen unit of the class described having three vertical flat walls, comprising a first vertical wall formed with an aperture, a translucent screen extended across said aperture, a second vertical wall, a reflector lying flat against said second vertical wall and supported thereby, and a third flat vertical wall, said three walls being pivotally connected along adjacent edges for relative pivotal movement about two spaced axes between positions in one of which said walls are angularly arranged to form three sides of a hollow body and in the second of which said sides lie in adjacent parallelism, and a top wall pivotally connected to an upper edge of one of said side walls and being shaped with side edges of a length to extend in abutting contact with the upper edges of the other two side walls with said side walls angularly arranged, characterized in that said top wall is pivotally connected to the top edge of said first vertical wall carrying said screen and in that cooperating securing means on said top wall and on said second wall carrying said reflector fix the relationship of said top wall to said second wall and so the angular relationship of said second wall to said first wall when said walls are angularly arranged.

References Cited in the file of this patent

UNITED STATES PATENTS

| Number | Name | Date |
|---|---|---|
| 1,150,869 | Lewin | Aug. 24, 1915 |
| 1,283,590 | Stavenhagen | Nov. 5, 1918 |
| 1,671,449 | Readeker | May 29, 1928 |
| 1,901,182 | McCandless | Mar. 14, 1933 |

FOREIGN PATENTS

| Number | Country | Date |
|---|---|---|
| 648,936 | Great Britain | Jan. 17, 1951 |